INVENTOR.
Kazmier Wysocki
Thomas J. Benichasa

Raymond N. Matson
their PATENT AGENT

INVENTORS
Kazmier Wysocki
Thomas J. Benichasa

Raymond N. Matson
their PATENT AGENT

United States Patent Office 3,352,455
Patented Nov. 14, 1967

1

3,352,455
SORTER FOR NON-MAGNETIC AEROSOL VALVES AND OTHER CLOSURES HAVING ATTACHED TUBES, ETC.
Kazmier Wysocki, 293 Hudson St., Hackensack, N.J. 07307, and Thomas J. Benichasa, Hackensack, N.J.; said Benichasa assignor to said Wysocki
Filed July 8, 1966, Ser. No. 563,755
12 Claims. (Cl. 221—167)

ABSTRACT OF THE DISCLOSURE

An inclined, rotating sorting disc having circumferentially spaced pockets and forming the bottom of a bin containing randomly arranged valves having dip tubes so that valves falling into the pockets are elevated and oriented by the pockets from which they are removed and aligned by a discharge chute.

---

This invention relates generally to sorting apparatus and more particularly to an apparatus for sorting or orienting non-magnetic elongated aerosol valves and other special closures which have dip tubes, extensions, etc. and which are haphazardly arranged in a supply bin, and delivering them in an oriented aligned position to a point of discharge.

Apparatus of this general type is known in the art and one example thereof is illustrated by Benichasa Patent No. 3,054,170, dated Sept. 18, 1962 in which a supply of randomly arranged valve assemblies are individually picked up from a hopper by spaced magnetic means arranged on a rotating disc and delivered in oriented position to a chute which picks them off of the disc and delivers them to a valve closure inserting apparatus. While such apparatus has only achieved an efficiency of 25–40%, it nevertheless has been indispensable to the highly automated packaging industry.

However, such magnetic apparatus cannot handle the newer valve assemblies which are formed of non-magnetic materials such as aluminum, stainless steels, and various of the plastics and accordingly, the main object of the present invention is to provide an improved, highly efficient sorter apparatus which obviates the above and other inadequacies of known apparatus.

An important object of the present invention is to provide an improved sorter apparatus which can readily pick up, orient and discharge all types of randomly presented valve assemblies, closures, or similar components having dip tubes or other slender projections from a bulk supply in a bin with a high degree of efficiency.

Another important object of the present invention is to provide an improved sorter apparatus having a relatively low speed rotary disc which will pick up, orient and discharge up to 300 valve assembly units of varying body diameter or tube length per minute without scuffing or marring the finish of the units, or otherwise damaging them.

A further important object of the present invention is to provide an improved sorter apparatus in which a disc provided with circumferentially spaced, recessed pockets rotates under a randomly arranged supply of valve assemblies in a bin to successively pick up one or more and orient them while elevating them to a pick off rail and chute for discharge to valve inserting apparatus for containers, etc.

A still further important object of the present invention is to provide an apparatus of the type described in which means is provided for preventing accidentally dislodged valve assemblies from dislodging other assemblies picked up by the disc, and additional means to facilitate intentional dislodging and discharge of the assemblies from the disc onto the discharge chute.

Other objects and advantages of the invention will become apparent during the course of the following description.

In the drawings one embodiment of the invention is shown. In this showing:

FIGURE 2 is a plan view of the invention looking along the line 2—2 of FIGURE 1;

Figure 1:
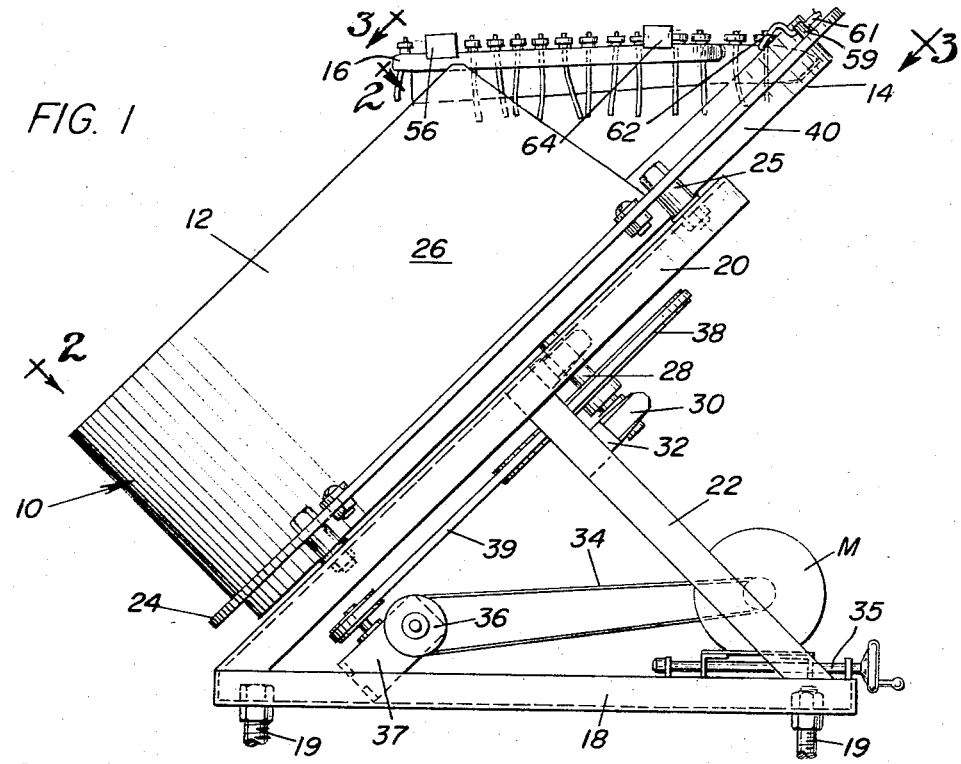
FIGURE 1 is a side elevational view of the apparatus comprising the present invention.
Figure 3:
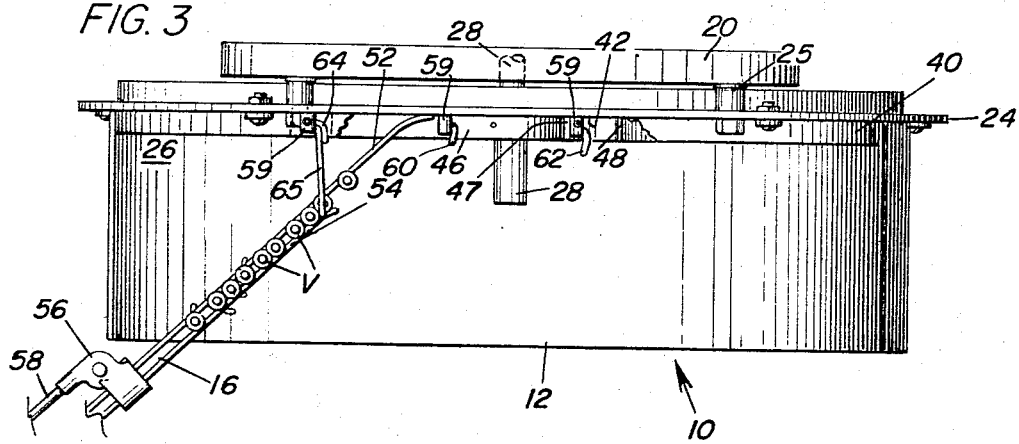
FIGURE 3 is a fragmentary plan view thereof looking along the line 3—3 of FIGURE 1, parts being broken away.

Referring to the drawings, numeral 10 designates the sorter apparatus as a whole which comprises an inclined hopper 12, a rotatable, valve assembly-elevating disc 14, a pick-off chute 16, and a supporting frame 18.

As disclosed in FIGURE 1, a plurality of legs 19 support the frame 18 upon which an inclined rectangular frame 20 is supported at an angle of approximately 45° by spaced straps 22, the inclined frame 20 in turn supporting a parallely disposed ring 24 at spaced circumferential points by spacer sleeves and bolts 25. The hopper 12 includes a circular wall 26 open at its upper side which is fixed to the ring 24 as by welding so that their inner surfaces are flush.

The disc 14 is of slightly less diameter than and concentrically and coplanarly mounted within the ring 24 on a shaft 28 which is rotatably mounted in a pillow block 30 fixed to a bar 32 spanning the straps 22. Rotation of the disc 14 is effected by a variable speed motor M through a chain or belt 34 having tightening means 35 and connected to the sprocket or pulley 36 of a speed reducer 37 which drives a pulley 38 fixed to the shaft 28 of the disc 14 by a belt 39.

Figure 4:
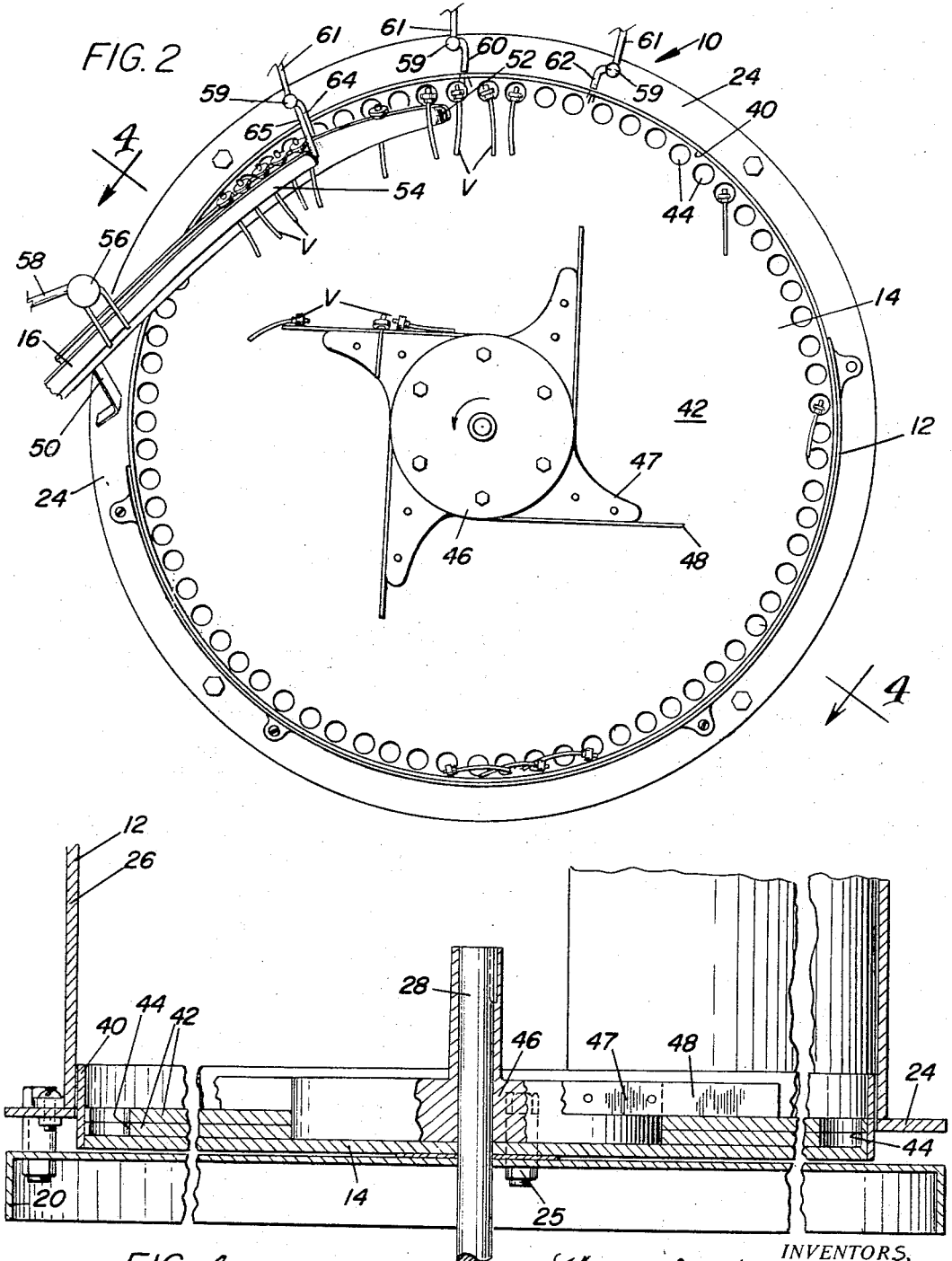
FIGURE 4 is an inclined sectional view taken on the line 4—4 of FIGURE 2.

The valve assembly-elevating disc 14 is preferably formed of aluminum with an upstanding peripheral flange 40 within and to which a facing layer or layers 42 of composition material such as masonite which will not mar or scuff valve assemblies, is fixed. As shown in FIGURES 2 and 4, a plurality of circumferentially spaced, circular pockets 44 are formed in the facing material 42 adjacent the flange 40 and are of a diameter substantially larger than that of the bodies of the valve assemblies V to be received therein. It will be noted (FIGURE 1) that the disc 14 functions as a part of the bottom of the hopper 12 so that upon rotation of the disc 14 by the motor M, the bodies of the valve assemblies contained in the hopper will drop by gravity in the pockets 44 as they pass successively under the supply in the hopper.

The outer end of the disc driving shaft 28 projects above the disc 14 and has a star wheel 46 fixed thereto which lies against the disc facing 42. As disclosed, the star wheel 46 is provided with four points 47 each of which may be elongated if desired by attached plates 48. The important function of the star wheel 46 which rotates with the disc 14, is to catch any valve assemblies V which are accidentally dislodged before reaching the discharge chute 16 at the highest point reached during rotation of the disc 14 by the pockets 44, and to return them to the hopper bottom on the side of the star wheel opposite from the valve assemblies being elevated in the pockets, thus preventing interference therewith.

The pick-off chute 16 which is supported by a bracket 50 (FIGURE 2) on the ring 24 extends generally tangentially from a point closely adjacent the uppermost path of travel of the pockets 44 in the inclined rotatable disc 14 downwardly at an angle of about 15° and outwardly to a point of discharge, which may be the feed for a valve inserting apparatus, etc. The chute comprises a pair of parallel laterally spaced rails 52, 54 upon which the valve bodies slide by gravity in aligned, oriented position with their dip tubes or extensions depending between the rails as shown. The upper end of the rail 54 terminates at a point spaced from the disc 14 while the upper end of the rail 52 is widened so that its side surface curves into the plane of the disc and is closely spaced therefrom so as to intercept the extensions of the valve assemblies so that they will be conducted from the disc pockets 44 down the body supporting rails 52, 54 by gravity.

Because of the high feed rate of the valve assemblies V to the pick-off chute 16 by the disc pockets 44 (200–300 per minute) at a relatively low disc rotational speed of 8–12 r.p.m., a chute vibrator 56 is mounted thereon adjacent the chute supporting bracket 50. The vibrator promotes the continuous flow of valve assemblies on the upper edges of the rails 52, 54 of the chute 16 and also assists in their orientation at the pick-off point onto the rails. While any suitable type of vibrator may be employed, a pneumatic vibrator is disclosed which is connected with a source (not shown) of compressed air by a conduit 58. It will be appreciated in general that the orienting action of the sorter is enhanced by the effect of gravity and by the miscellaneous vibratory forces generated by the driving motor M and the rotation of the disc.

Specifically these forces facilitate the movement of the dip tubes to a depending position due to their weight and overcome the clinging friction between two or more crossed dip tubes depending from the valve bodies being elevated in a single pocket 44. Also, the upstanding flange 40 of the disc 14 limits excessive outward swinging of the dip tubes during their gravity actuated orienting movements as they are elevated by the pockets.

A further feature of the invention resides in the provision of a pair of air jets 60, 62 formed of thin bendable tubing connected to the same source of air by conduits 61 and mounted by fittings 59 on the ring 24 adjacent and just in advance of the point of interception of the valve assemblies V by the pick-off chute 16 to expedite their removal from the pockets 44 in unentangled oriented position by directing small streams of air along the dip tubes. A third air jet 64 coupled with a horizontal deflector 65 to brush off a flowing pile-up of valve assemblies and also mounted on the ring 24, is directed to a point on the chute 16 where it is effective in unpiling overlapped valve bodies moving therealong, such piling up sometimes occurring when a single pocket 44 has carried several valve assemblies to the intercepting pick-off chute 16. The deflector 65 mechanically and the air jet pneumatically combine to brush off and blow any pile-up of valve assemblies out of the path of the oncoming valve assemblies from the disc. Thus, it is ensured that the valve assemblies V are conducted by gravity in aligned, oriented fashion down the chute 16 to the discharge point.

The operation of the sorting device comprising the present invention is believed to be apparent. Elongated valve assemblies or closures V of various sizes and types are continuously fed by suitably controlled apparatus (not shown) to the hopper 12 so as to maintain an adequate, randomly arranged supply therein as the disc 14 is driven by the motor M. As the disc 14 rotates under the supply, the valve assemblies V drop into and are moved by the pockets 44 which then elevate them to the pick-off rail 52 of the chute 16 if the valve bodies are in the pockets. As explained, the valve assemblies are self oriented by gravity due to the weight of the dip tubes or valve extensions which action is enhanced by the indirect vibration imparted as described from operation of the apparatus and by the directed air streams from the jets 60, 62.

Due to the random arrangement of the supply of valve assemblies, some of the pockets 44 will fail to pick up any valves while other pockets will carry several to the pick-off chute 16 and the sorter 10 has attained an efficiency as high as 80% based upon the number of pockets passing the pick-off chute and the number of valves removed thereby. Thus, the sorter can discharge aligned and oriented valve assemblies, etc. at a rate of 200–300 per minute at disc rotational speeds of 8–12 r.p.m. as a general average which however, may vary or be varied.

Figure 5:
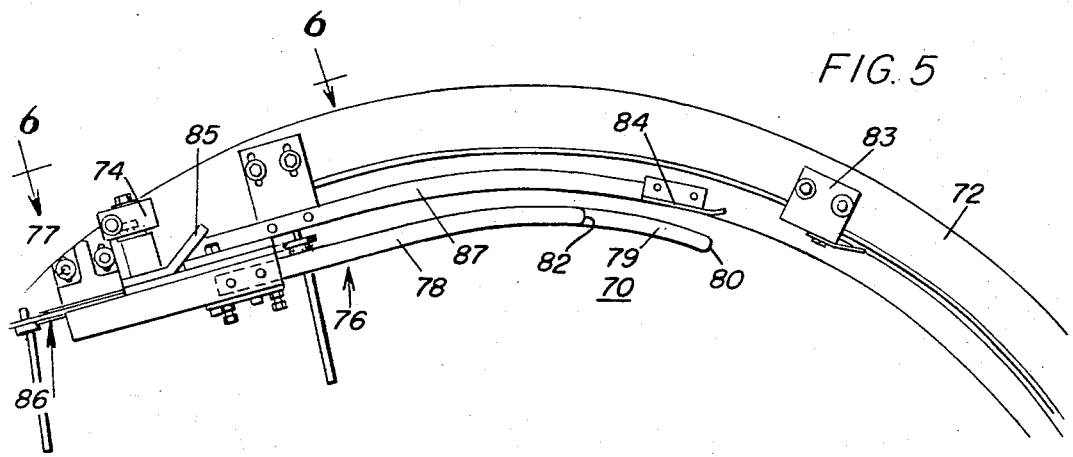
FIGURE 5 is a top plan view similar to FIGURE 2 of a modified form of valve pick-off chute.
Figure 6:
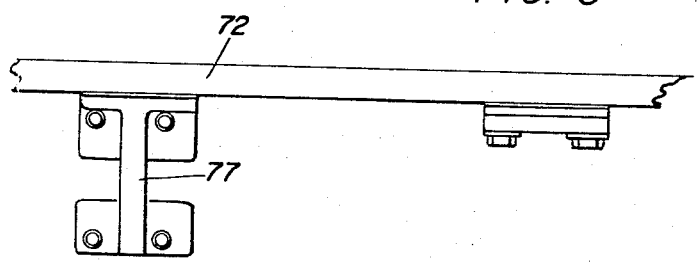
FIGURE 6 is a fragmentary rear elevational view thereof looking along the line 6—6 of FIGURE 5.
Figure 7:
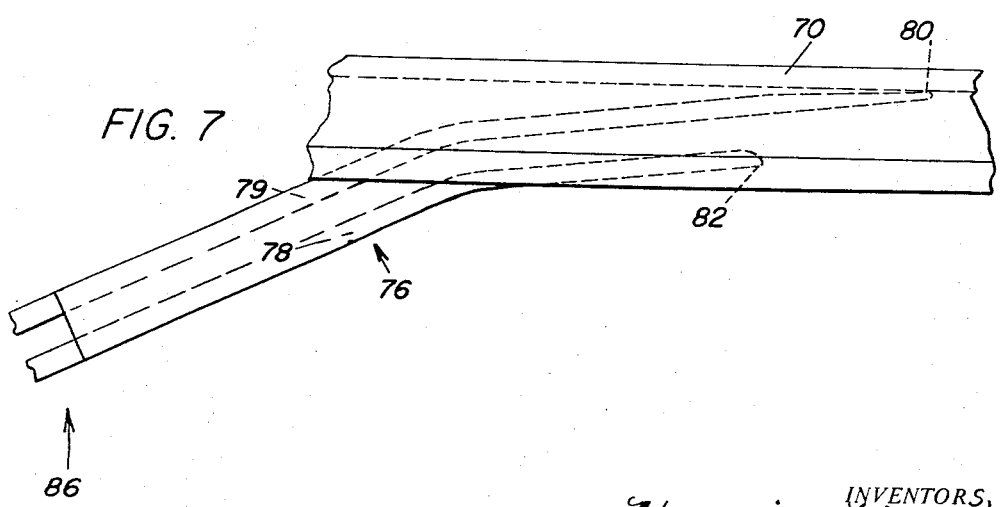
FIGURE 7 is an enlarged fragmentary diagrammatic view similar to FIGURE 3 illustrating the action of the pick-off rails.

FIGURES 5–7 inclusive disclose a modified form of the pick-off chute which is more advantageously used where the valve assembly elevating disc approaches the vertical or is substantially vertically disposed. As shown, a valve assembly pick-up disc 70 rotates within a ring 72 upon which a vibrator 74 and the pick-up chute 76 is mounted by a bracket 77. In order to avoid jamming of the valve assemblies due to their high rate of feed on the chute which occurs if it embodies a sudden change of direction, the chute 76 is arranged tangentially to the path of the valve assemblies being elevated by the disc 70.

The pick-up chute 76 comprises the upper end of the valve assembly discharge chute 86 and comprises a pair of horizontally spaced pick-off rails 78 and 79, the upper end of the former being shorter than the latter as shown diagrammatically in FIGURE 7. The outer rail 79 extends along the face of the disc 70 and terminates in a taper substantially in contact therewith as at 80. In operation, as the valve assemblies arrive at point 80, the outer tapered track 79 being behind the dip tubes, in essence pries the assemblies away from the disc 70. As the valve bodies move away, their opposite sides are caught and supported by the inner rail 78 and the assemblies then move rapidly down the pick-off chute 76 and discharge chute 86 under the action of gravity and the vibration imparted by the vibrator 74.

In order to stabilize the assemblies picked off the disc, a stabilizer rail 87 is vertically spaced from the rail 79 and fixed to the pick-off chute 76, and is similarly shaped and coextensive with the rail 79 so that the inner edges of the valve bodies are relatively confined by the spaced rails 87, 79. Supplementary means to help stabilize, orient and position the valve assemblies for entry between points 80, 82 of the pick-off chute 76 may be employed and these comprise spaced valve assembly deflectors 83, 84 fixed to the ring 72. A similar deflector 85 may be mounted on the guide rails 76 adjacent the vibrator 74 in order to prevent a pile-up of valve assemblies from entering the discharge chute 86 which is more confining than the pick-off chute 76. Obviously, air jets similar to jets 60, 62 and 64 may also be employed. It will be understood that the term valve assemblies is intended to mean elongated valve bodies, bodies with dip tubes, similar closure assemblies, and any other components having similar shapes or proportions.

It is to be understood that the form of the invention herewith shown and described is to be taken as a preferred example of the same and that various changes in the shape, size and arrangement of parts may be resorted to without departure from the spirit of the invention or the shape of the subjoined claims.

What is claimed is:

1. A sorter for delivering oriented and aligned valve bodies having dip tubes from a bin containing a randomly arranged mass thereof to a discharge point comprising, in combination, a disc rotatable about an inclined axis and forming a part of the bottom of the bin; a plurality of circumferentially spaced, valve body receiving pockets formed in the surface of said disc and being of greater diameter than the body of the valves; a pick-off chute positioned adjacent and extending to the surface of said disc to engage the depending dip tubes of valve bodies received in said pockets when elevated by rotation of said disc, and inclining downwardly to remove the valve bodies from the disc pockets and convey them by gravity to the discharge point; and means for rotating said disc to effect gravity deposit of the valve bodies into the disc pockets from the bin and the depending of the dip tubes from their bodies in the pockets to orient them by gravity during rotary elevating movement of the pockets to said pick-off chute; and means positioned adjacent the upper end of said pick-off chute and operable to assist the orientation of elevated valve bodies in said pockets.

2. The combination recited in claim 1, and means for vibrating the pick-off chute to facilitate the downwardly inclined movement of the valve bodies therealong to the discharge point.

3. The combination recited in claim 1, and means associated with said rotatable disc and operable to deflect accidentally dislodged valve bodies from said pockets out of the path of other valve bodies picked up by said disc.

4. The combination recited in claim 3 wherein said associated means comprises a star wheel fixed to and concentric with said disc.

5. The combination recited in claim 1, and means fixed to said disc for catching valve bodies accidentally dislodged from said pockets and returning them to the bin.

6. The combination recited in claim 5 wherein said associated means comprises a star wheel fixed to and concentric with said disc.

7. The combination recited in claim 1 wherein said assisting means comprises an air jet.

8. The combination recited in claim 1, and means positioned adjacent the upper end of said pick-off chute to eliminate pile-ups of said valve bodies on said pick-off chute.

9. The combination recited in claim 8 wherein said eliminating means comprises an air jet.

10. The combination recited in claim 8 wherein said eliminating means comprises a deflector engageable with bodies piling up on said chute.

11. The combination recited in claim 1 wherein said chute comprises a pair of closely spaced guide rails of which the closer to the disc extends beyond the other against the direction of rotation of said disc to dislodge the valve body therefrom for substantially immediate subsequent support by both of said rails during movement therealong.

12. The combination recited in claim 1 wherein said inclined disc is substantially vertical.

References Cited
UNITED STATES PATENTS

| | | | |
|---|---|---|---|
| 2,138,232 | 11/1938 | Giannini | 221—277 |
| 3,012,651 | 12/1961 | Hawkes | 198—33 |
| 3,054,170 | 9/1962 | Benichasa | 221—167 |
| 3,260,403 | 7/1966 | Wonneman | 221—174 |

ANDRES H. NIELSEN, *Primary Examiner.*

R. E. AEGERTER, *Assistant Examiner.*